(12) United States Patent
Merryman

(10) Patent No.: US 10,239,400 B2
(45) Date of Patent: Mar. 26, 2019

(54) AUTOMATED SUNSHADE APPARATUS

(71) Applicant: Donald Merryman, La Quinta, CA (US)

(72) Inventor: Donald Merryman, La Quinta, CA (US)

( * ) Notice: Subject to any disclaimer, the term of this patent is extended or adjusted under 35 U.S.C. 154(b) by 283 days.

(21) Appl. No.: 15/232,375

(22) Filed: Aug. 9, 2016

(65) Prior Publication Data

US 2018/0043758 A1    Feb. 15, 2018

(51) Int. Cl.
*B60J 3/00* (2006.01)
*B60J 11/04* (2006.01)

(52) U.S. Cl.
CPC ..................... *B60J 11/04* (2013.01)

(58) Field of Classification Search
CPC ........................................................ B60J 11/04
See application file for complete search history.

(56) References Cited

U.S. PATENT DOCUMENTS

| | | | |
|---|---|---|---|
| 4,923,244 A | 5/1990 | Clenet | |
| 6,561,257 B2 | 5/2003 | Huang | |
| 8,167,356 B1 | 5/2012 | Morazan | |
| 2004/0135393 A1* | 7/2004 | Neuer | B60J 7/165 296/136.1 |
| 2004/0178618 A1* | 9/2004 | Rhea | B60J 11/00 280/770 |
| 2009/0038766 A1* | 2/2009 | Smith, Jr. | B60J 11/06 160/370.21 |
| 2011/0290170 A1* | 12/2011 | Russikoff | B63B 17/02 114/361 |

FOREIGN PATENT DOCUMENTS

| | | | | |
|---|---|---|---|---|
| JP | 09224814 A | * | 9/1997 | |
| WO | WO-2004060097 A2 | * | 7/2004 | ............ B60J 11/02 |

* cited by examiner

*Primary Examiner* — Lori L Lyjak
(74) *Attorney, Agent, or Firm* — Cramer Patent & Design, PLLC; Aaron R. Cramer

(57) ABSTRACT

An automated sunshade apparatus for protectively shading a roof of a vehicle includes one or more support members, a first elongate member, two sets of flexible shades, and a second elongate member. The first elongate member is rigidly attached to the support members positioned at an end of the roof. The flexible shades are positioned above the first elongate member, each set of flexible shades fixedly attached to rods operably connected to a linkage of a drive mechanism. The linkage is pivotably attached to a central portion of the first elongate member and configured to retractably extend the flexible shades outwardly in one of a clockwise and a counter clockwise direction over the roof of the vehicle. The second elongate member is positioned above and apart from the first elongate member and is rigidly attached to the first elongate member for accommodating the retracted flexible shades therebetween.

20 Claims, 8 Drawing Sheets

AUTOMATED SUNSHADE APPARATUS

FIELD OF THE INVENTION

The invention disclosed herein relates generally to a vehicle sunshade and more particularly to an automated vehicle sunshade.

BACKGROUND

Conventionally, automobiles exposed to sunlight in summer develop high cabin temperatures. In order to overcome this disadvantage, various sunshades have been proposed to shield parked automobiles from sunlight. Typically, these disclosed sunshades usually suffer drawbacks such as small shade area, inconvenience to use, or too expensive to commercialize. A sunshade which is sufficiently large, convenient to use, and affordable to commercialize is thus required. Additionally, the drawbacks of other conventional designs are, for example, complicated mechanic structure, high cost, poor shielding effect as a sunshade, etc. A sunshade, which is not at all complicated in design, is required. Furthermore, conventional sunshades cannot be used in regions of high wind speeds as they eventually are damaged beyond repair. A design of the sunshade, which reduces the tendency to be damaged easily, must be incorporated.

In countries, for example, Switzerland, France, Germany, etc., skiing is a recreational activity. Skis are typically positioned on the roof of a vehicle. Sometimes, ski racks are provided in order to help the skis to be fastened to the ski rack. The sunshade must have a retractable design, which helps the automated sunshade double as a ski rack. Moreover, in countries where surfing is a recreational activity, surfboards are fastened onto the roof of the vehicle using loading racks. For such applications, the automated sunshade must be designed to double as a loading rack for the surfboard.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The automated sunshade apparatus disclosed herein addresses the above-mentioned need for a sunshade with a large shielding area. Furthermore, the automated sunshade apparatus addresses the above-mentioned need for a less complicated sunshade, convenient to use. Moreover, the automated sunshade apparatus addresses the above-mentioned need for an apparatus, which can be used in regions having high wind speeds. Additionally, the automated sunshade apparatus addresses the above-mentioned need for an apparatus, which can also be used as a ski rack or a surfboard rack.

The automated sunshade apparatus for protectively shading a roof of a vehicle comprises one or more support members, a first elongate member, two sets of flexible shades, and a second elongate member. The support members are positioned at an end of the roof. The first elongate member is rigidly attached to the support members. The two sets of flexible shades are positioned above the first elongate member. Each set of flexible shades is fixedly attached to multiple rods operably connected to a linkage of a drive mechanism. The linkage is pivotably attached to a central portion of the first elongate member. The linkage is configured to retractably extend the two sets of flexible shades outwardly in a clockwise direction or a counter clockwise direction over the roof of the vehicle. The second elongate member is positioned above and apart from the first elongate member. The second elongate member is rigidly attached to the first elongate member for accommodating the two sets of flexible shades retracted therebetween.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF THE INVENTION

Figure 1:
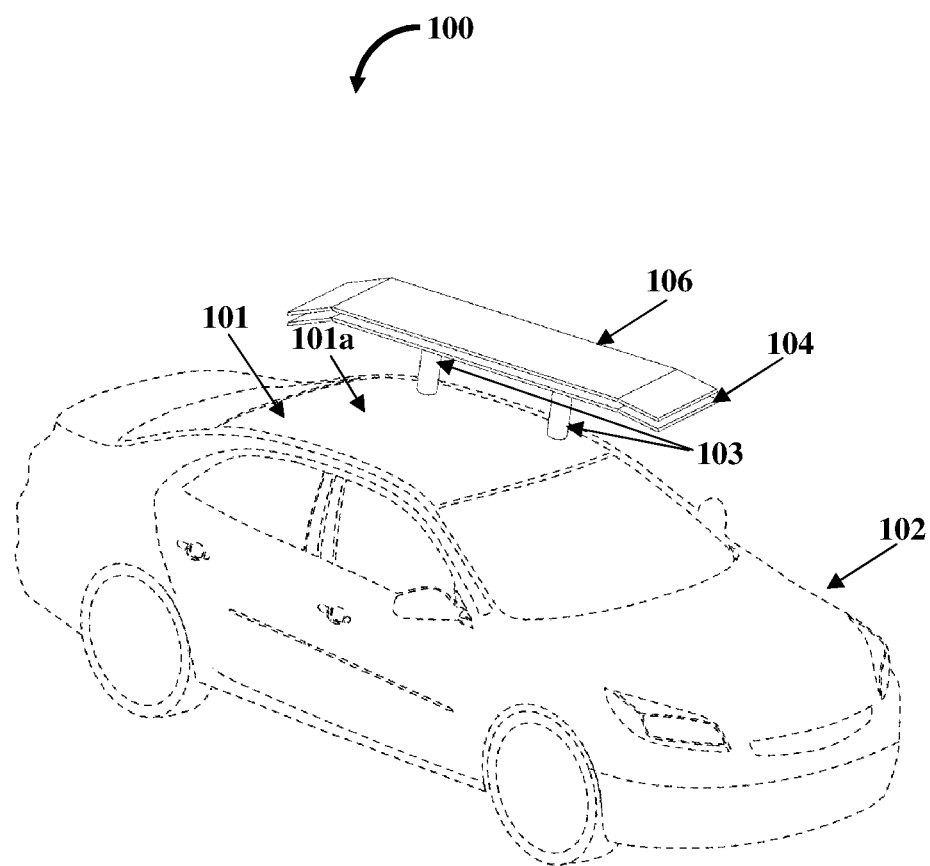
FIG. 1 exemplarily illustrates a top perspective view of an automated sunshade apparatus positioned on a roof of a vehicle.

FIG. 1 exemplarily illustrates a top perspective view of an automated sunshade apparatus 100 positioned on a roof 101 of a vehicle 102. In an embodiment, the vehicle 102 is, for example, a sedan. Initially, the automated sunshade apparatus 100 is in the retracted state as exemplarily illustrated in FIG. 1. The automated sunshade apparatus 100 for protectively shading a roof 101 of a vehicle 102 comprises one or more support members 103, a first elongate member 104, two sets of flexible shades 105a and 105b, and a second elongate member 106 as exemplarily illustrated in FIGS. 1-2. The support members 103 are positioned at an end 101a of the roof 101. The first elongate member 104 is rigidly attached to the support members 103. The two sets of flexible shades 105a and 105b are positioned above the first elongate member 104 as exemplarily illustrated in FIG. 2.

Each set of flexible shades 105a and 105b is fixedly attached to multiple rods 107 operably connected to a linkage 109 of a drive mechanism 108. The linkage 109 is pivotably attached to a central portion 104a of the first elongate member 104.

The linkage 109 is configured to retractably extend the two sets of flexible shades 105a and 105b outwardly in a clockwise direction or a counter clockwise direction over the roof 101 of the vehicle 102. The second elongate member 106 is positioned above and apart from the first elongate member 104. The second elongate member 106 is rigidly attached to the first elongate member 104 for accommodating the two sets of flexible shades 105a and 105b retracted therebetween. In an embodiment, the first elongate member 104 and the second elongate member 106 are made of, for example, lightweight metal, hard plastic materials, etc. In an embodiment, the first elongate member 104 and the second elongate member 106 are separated by about 6 inches in order to accommodate the two sets of flexible shades 105a and 105b. Furthermore, the first elongate member 104 is positioned about 6 inches above the roof 101 to allow airflow. The first elongate member 104 and the second elongate member 106 are made to withstand harsh weather conditions, for example, high speed winds, etc. The drive mechanism 108 enables extension and retraction of the flexible shades 105. The retractable feature of the automated sunshade apparatus 100 provides appeal that is aesthetic and prevents damage when the automated sunshade apparatus 100 is not in use.

Figure 2:
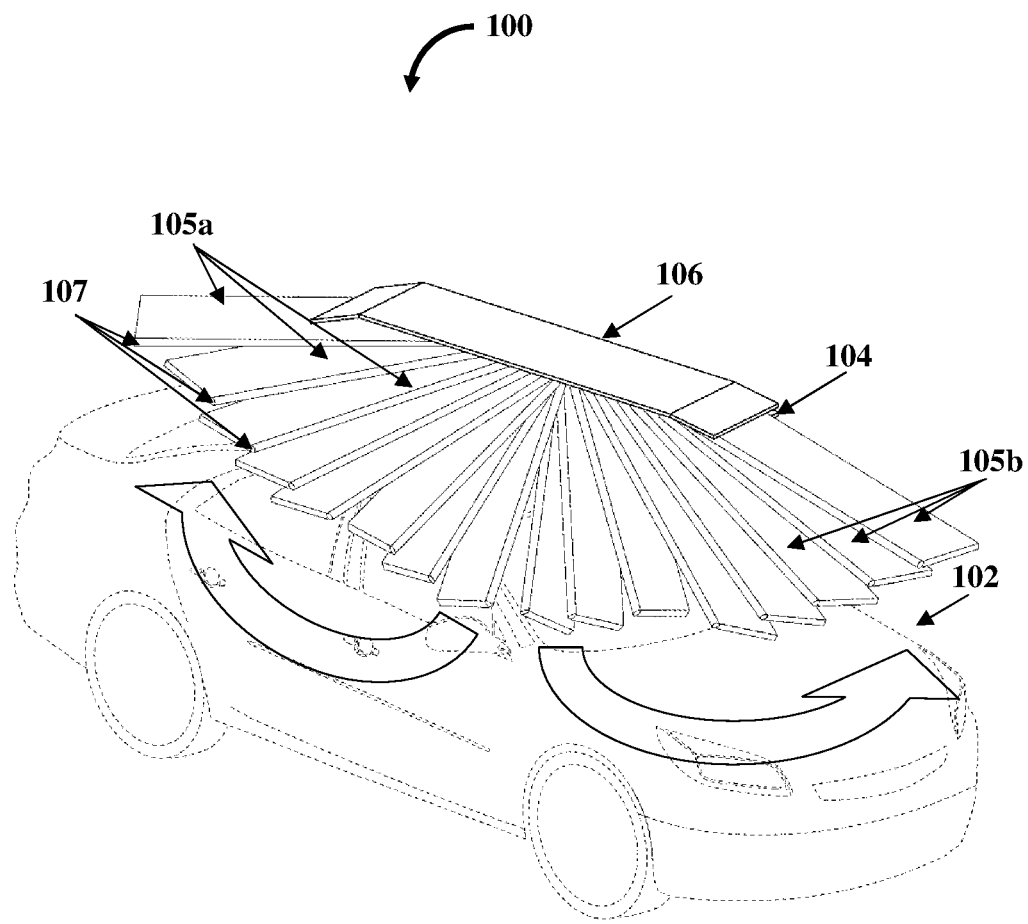
FIG. 2 exemplarily illustrates a top perspective view of an automated sunshade apparatus positioned on a roof of a vehicle showing multiple flexible shades in the extended position.

FIG. 2 exemplarily illustrates a top perspective view of an automated sunshade apparatus 100 positioned on a roof 101 of a vehicle 102 showing two sets of the flexible shades 105a and 105b in the extended position. Each of the flexible shades 105a and 105b are attached to multiple rods 107. The rods 107 are positioned in the space between the first elongate member 104 and the second elongate member 106. The rods 107 are operably connected to a linkage 109 of a drive mechanism 108 exemplarily illustrated in FIG. 3. The linkage 109 retractably extends the rods 107 outwardly in a clockwise direction over the roof 101 of the vehicle 102. In an embodiment, the flexible shades 105a and 105b are of the same colors and arranged in an alternating arrangement. In another embodiment, the flexible shades 105a and 105b are of different colors and arranged in an alternating arrangement. Furthermore, in an embodiment, the flexible shades 105a and 105b are made of different materials, for example, cloth, plastics, etc.

Figure 3:
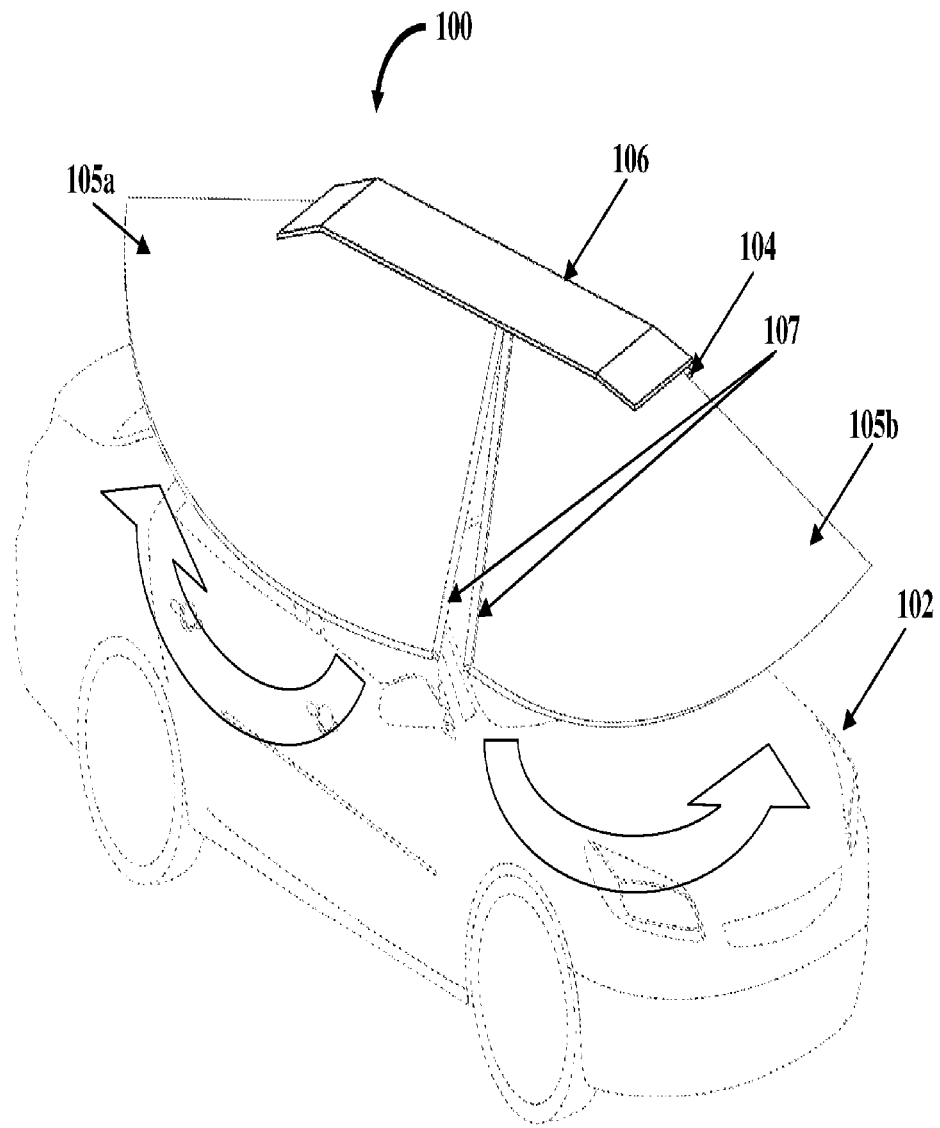
FIG. 3 exemplarily illustrates a top perspective view of an automated sunshade apparatus positioned on a roof of a vehicle showing flexible shades made of a single continuous material in the extended position.

FIG. 3 exemplarily illustrates a top perspective view of an automated sunshade apparatus 100 positioned on a roof 101 of a vehicle 102 showing flexible shades 105a and 105b made of a single continuous material in the extended position. Moreover, in an embodiment, the single continuous material is made of, for example, cloth, plastics, etc.

Figure 4:
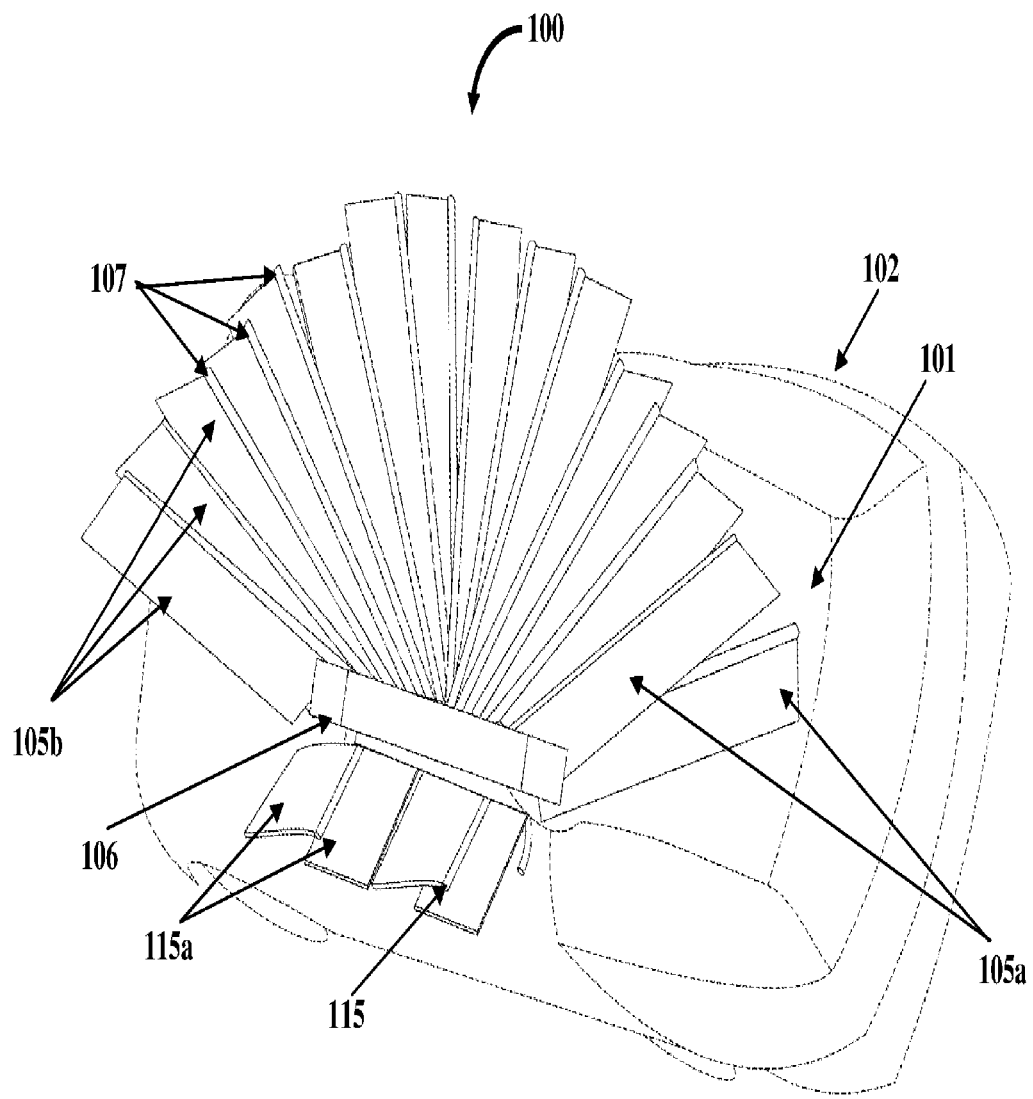
FIG. 4 exemplarily illustrates a top perspective view of an automated sunshade apparatus positioned on a roof of a vehicle showing multiple flexible shades and multiple auxiliary shades in the extended position.

FIG. 4 exemplarily illustrates a top perspective view of an automated sunshade apparatus 100 positioned on a roof 101 of a vehicle 102 showing multiple flexible shades 105a and 105b and multiple auxiliary shades 115a in the extended position. In an embodiment, the automated sunshade apparatus 100 comprises auxiliary rods 115 for extending auxiliary flexible shades 115a away from the roof 101 of the vehicle 102 as exemplarily illustrated in FIG. 5. The auxiliary rods 115 extend or retract based on motion of the drive mechanism 108 as exemplarily illustrated in FIG. 5. The auxiliary flexible shades 115a provide shade towards the driver's side of the vehicle 102.

Figure 5A:
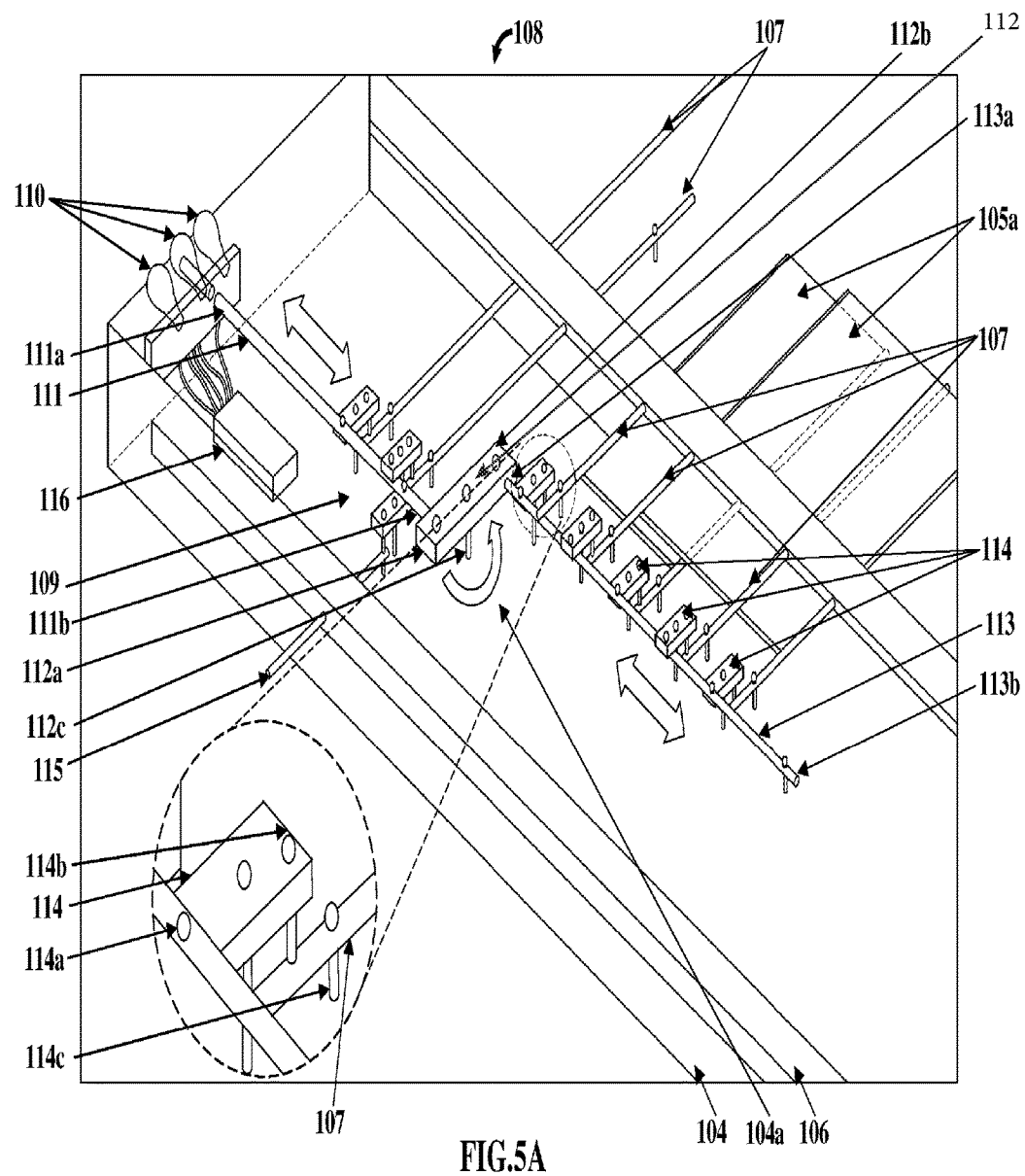
FIG. 5A exemplarily illustrates a perspective view of a drive mechanism of an automated sunshade apparatus.

FIG. 5A exemplarily illustrates a perspective view of a drive mechanism 108 of an automated sunshade apparatus 100. The drive mechanism 108 comprises one or more electric motors 110 and a linkage 109. The electric motors 110 are operably connected to the linkage 109 of the drive mechanism 108. The linkage 109 comprises a driving rod 111, a primary platelet 112, a driven rod 113, and multiple secondary platelets 114. As used herein, a "platelet" refers to a small flat metal piece, which is generally rectangular in geometry. The driving rod 111 comprises a first end 111a and a second end 111b. The driving rod 111 is operably coupled to the electric motors 110 at the first end 111a for moving the driving rod 111 in a forward direction or a reverse direction as exemplarily illustrated in FIG. 3. The primary platelet 112 comprises a first end 112a and a second end 112b. The primary platelet 112 is pivotably attached to the central portion 104a of the first elongate member 104 via a pivot pin 112c. The first end 112a of the primary platelet 112 is operably coupled to the second end 111b of the driving rod 111. A forward motion of the driving rod 111 produces a rotary motion of the primary platelet 112. The driven rod 113 comprises a first end 113a and a second end 113b. The driven rod 113 is operably coupled to the second end 112b of the primary platelet 112. A rotary motion of the primary platelet 112 produces a forward motion or a backward motion in the driven rod 113.

The secondary platelets 114 are positioned on the driving rod 111 and the driven rod 113 as exemplarily illustrated in FIG. 5A. The secondary platelets 114 are spaced apart equally. Each of the secondary platelets 114 comprise a first end 114a and a second end 114b and are pivotally attached to the first elongate member 104 via a pivot pin 114c. The first end 114a of the each of the secondary platelets 114 are attached to either the driving rod 111 or the driven rod 113. The second end 114b of each of the secondary platelets 114 are operably coupled to one of the two sets of flexible shades 105a or 105b. A rotary motion of each of the secondary platelets 114 retractably extend the two sets of flexible shades 105a and 105b outwardly in a clockwise direction or a counter clockwise direction over the roof 101 of the vehicle 102. In an embodiment, one or more auxiliary rods 115 are positioned vertically opposite the rods 107 fixedly attached to the flexible shades 105a and 105b. Each of the auxiliary rods 115 are fixedly attached to an auxiliary flexible shade 115a. The auxiliary rods 115 are configured to extend the auxiliary flexible shades 115a beyond the end 101a of the roof 101 over the driver's side as exemplarily illustrated in FIG. 4.

In another embodiment, a user operates the automated sunshade apparatus 100 via a remote control device. A signal receiver 116 is operably connected to the automated sunshade apparatus 100 to receive signals from the remote control device and either open or close the automated sunshade apparatus 100. Consider the example of a user parking his vehicle 102 in an exposed parking spot. As and when he/she leaves the vehicle 102, he/she centrally locks the vehicle 102 using the remote control device. Additionally, when the user actuates a switch on the remote control device, the signal receiver 116 triggers the electric motor 110 of the automated sunshade apparatus 100 to extend the multiple flexible shades 105a and 105b over the roof 101 of the vehicle 102. Each individual flexible shade of the two sets of flexible shades 105a and 105b are spaced apart as part of a louvered arrangement for allowing wind to pass between adjacent flexible shades of the two sets of flexible shades 105a and 105b. This design enables the automated sunshade apparatus 100 to withstand high wind speeds without being damaged. The flexible shades 105a and 105b are made of, for example, cloth, flexible plastics, etc.

Figure 5B:
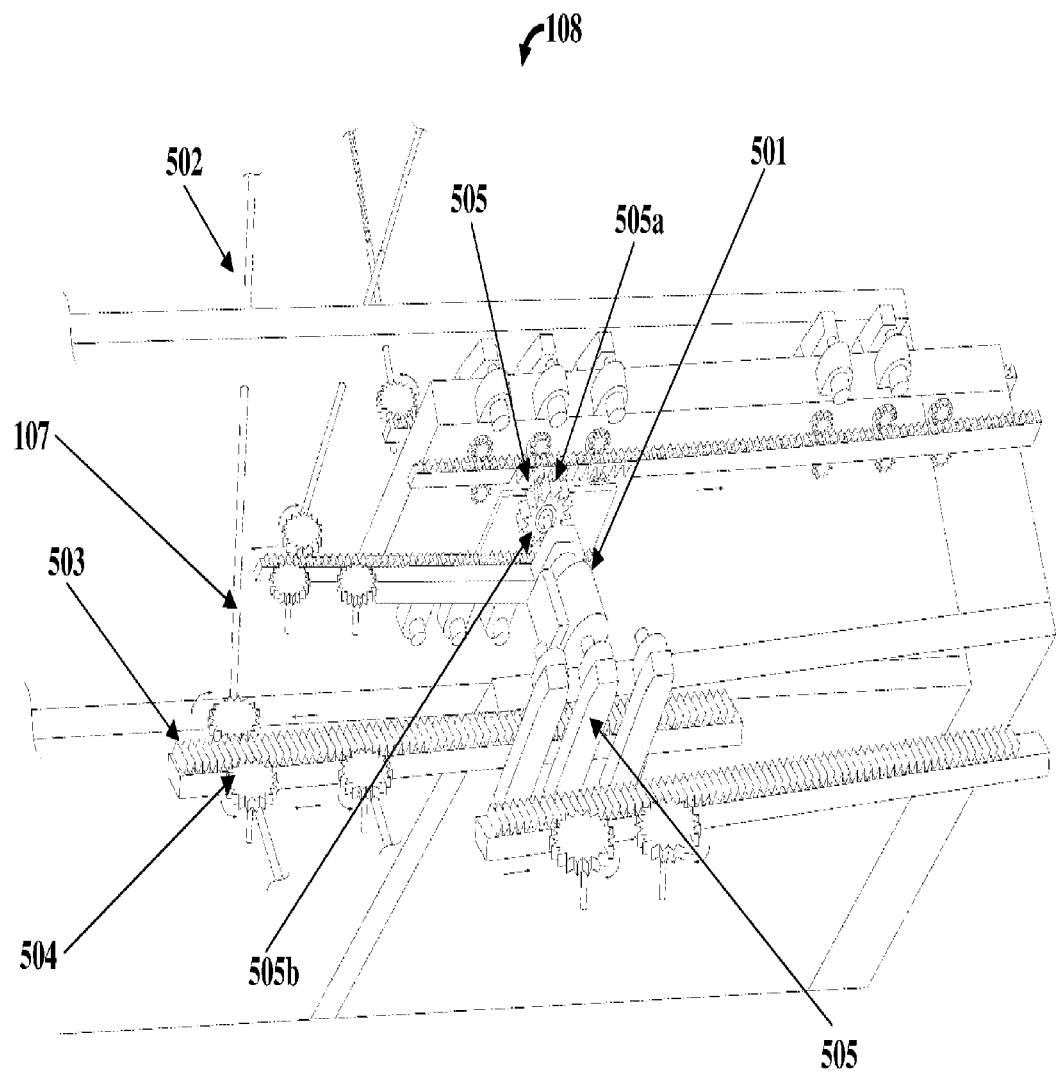
FIG. 5B exemplarily illustrates a perspective view of a drive mechanism of an automated sunshade apparatus.

FIG. 5B exemplarily illustrates a perspective view of a drive mechanism 108 of an automated sunshade apparatus 100. The drive mechanism 108 shown in FIG. 5A can be replaced by the drive mechanism 108 shown in FIG. 5B. In an embodiment, the drive mechanism 108 comprises one or more electric motors 501 and a linkage 502. The electric motors 501 are operably connected to the linkage 502 of the drive mechanism 108. The linkage 502 comprises horizontal racks 503 and driven gears 504. A vertical pinion 505 is mounted on the electric motor 501. In an embodiment, the horizontal racks 503 are operably engaged with the vertical pinion 505. The horizontal racks 503 engage with a top section 505a and a bottom section 505b of the vertical pinion 505 for moving the horizontal racks 503 in a forward direction or a reverse direction as exemplarily illustrated in FIG. 5B. The driven gears 504 are operably engaged to the horizontal racks 503 for moving the driven gears 504 in a clockwise direction or a counter clockwise direction. The set of driven gears 504 in contact with the lower horizontal rack 503 and the set of driven gear 504 in contact with the upper horizontal rack 503 rotate in opposite directions. This cause the horizontal racks 503 to move in opposing directions, for example, forward direction, reverse direction, etc. Furthermore, the rods 107 of the two sets of flexible shades 105a and 105b are operably engaged to the driven gears 504. A rotary motion of the driven gears 504 retractably extend the two sets of flexible shades 105a and 105b, exemplarily illustrated in FIG. 5A, in a clockwise direction or a counter clockwise direction over the roof 101 of the vehicle 102. In the embodiment, a rack and pinion gear arrangement is used to transfer motion. However, in other embodiments, various other types of gear assemblies are used, for example, worm gear, straight spur, helical spur, herringbone, plain bevel, spiral bevel, hypoid, planetary, etc.

Figure 6:
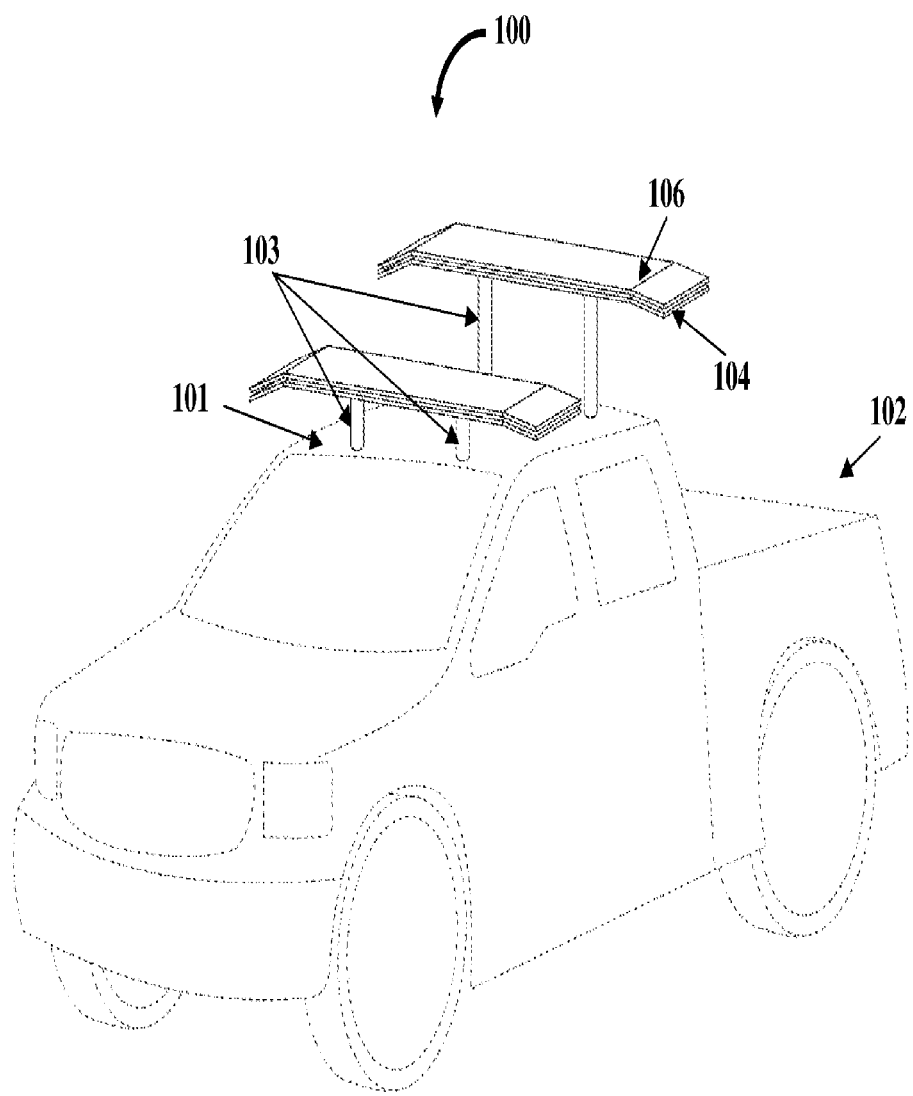
FIG. 6 exemplarily illustrates a top perspective view of multiple automated sunshade apparatuses positioned on a roof of a vehicle.

FIG. 6 exemplarily illustrates a top perspective view of multiple automated sunshade apparatuses 100 positioned on a roof 101 of a vehicle 102. In an embodiment, the vehicle 102 is, for example, a pickup truck. In an embodiment, the automated sunshade apparatuses 100 are positioned in a parallel configuration. The automated sunshade apparatuses 100 are positioned at opposing ends of the roof 101 of the vehicle 102 as exemplarily illustrated in FIG. 6. The positioning of the automated sunshade apparatus enables more complete shielding of the roof 101 of the vehicle 102. The drive mechanism 108 is positioned on the roof 101 of the vehicle 102 and extends or retracts the flexible shades 105 as exemplarily illustrated in FIGS. 5A-5B. In an embodiment, the automated sunshade apparatus 100 is positioned at parallel ends of the roof 101 as exemplarily illustrated in FIG. 6. In this arrangement, the automated sunshade apparatus 100 provides more coverage and shielding of the roof 101.

Figure 7:
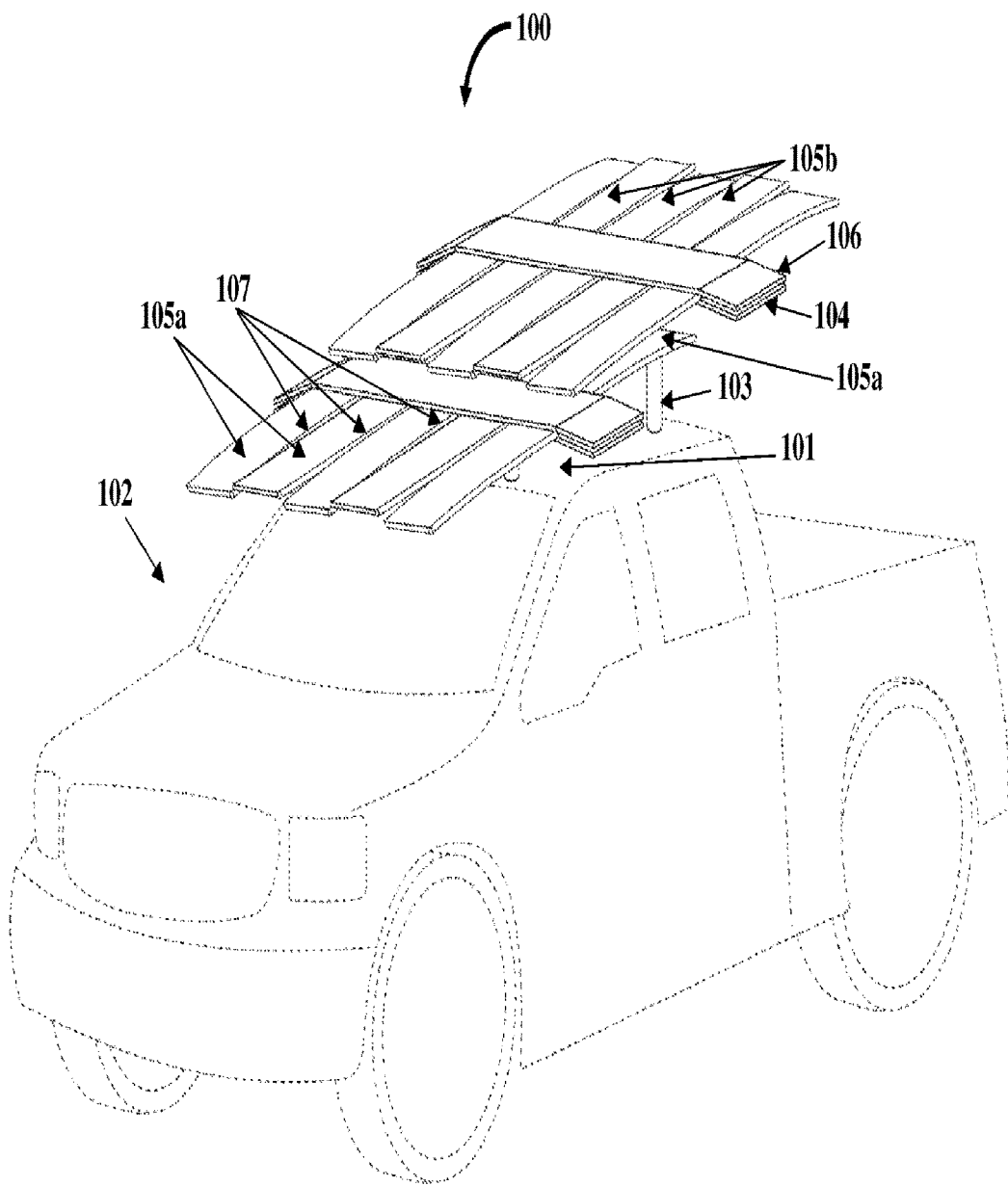
FIG. 7 exemplarily illustrates top perspective view of multiple automated sunshade apparatuses positioned on a roof of a vehicle, showing multiple flexible shades in an extended position.

FIG. 7 exemplarily illustrates a top perspective view of multiple automated sunshade apparatuses 100 positioned on a roof 101 of a vehicle 102, showing multiple flexible shades 105a and 105b in an extended position. In an embodiment, the vehicle 102 is, for example, a pickup truck. In an embodiment, the flexible shades 105b of one of the multiple automated sunshade apparatuses 100 overlap the flexible shades 105a of another set of the automated sunshade apparatuses 100 as exemplarily illustrated in FIG. 7. The flexible shades 105a and 105b are coupled to multiple rods 107. In an embodiment, the second elongate member 106 of the automated sunshade apparatus 100 is positioned above and apart from the first elongate member 104. The second elongate member 106 is rigidly attached to the first elongate member 104 for accommodating the retracted flexible shades 105a and 105b therebetween as exemplarily illustrated in FIG. 6. When a user actuates a remote control, the flexible shades 105a and 105b automatically extend or retract to the automated sunshade apparatus 100 depending on the selection made by the user. The drive mechanism 108 exemplarily illustrated in FIGS. 5A-5B is responsible for the extension and retraction of the rods 107 which in turn extend or retract the flexible shades 105a and 105b of both the automated sunshade apparatuses 100.

In an embodiment, each of the two sets of the flexible shades 105a and 105b are made of a single continuous solid material instead of a louvered arrangement. Moreover, the dimensions of the two sets of the flexible shades 105a and 105b, the first elongate member 104, and the second elongate member 106 are varied based on a make and a type of the vehicle 102. The automated sunshade apparatus 100 may be required to be installed on, for example, a sedan, a pickup truck, a jeep, a station wagon, a sports utility vehicle, a hatchback, etc. Different types and makes of the vehicle 102 have different dimensions, for example, roof length, roof width, windscreen area, etc. In such a scenario, the dimensions of the automated sunshade apparatus 100 are varied to suitably fit and cover the roof 101 of the vehicle 102. In another embodiment, the two sets of the flexible shades 105a and 105b are of single colors or of a combination of colors. In another embodiment, the automated sunshade apparatus 100 is extendable and retractable. This feature of the automated sunshade apparatus 100 enables it to be used on the roof 101 of multiple vehicles 102. That is, the automated sunshade apparatus 100 is either custom designed for the roofs 101 of different vehicles 102 or the automated sunshade apparatus 100 is of an extendable and retractable type. In the retractable and extendable type of automated sunshade apparatus 100, the whole unit is extendable and retractable to suitably cover the roof 101 and provide shade for the windscreen of the vehicle 102.

The foregoing examples have been provided merely for the purpose of explanation and are in no way to be construed as limiting of the automated sunshade apparatus 100, and the kit disclosed herein. While the automated sunshade apparatus 100 has been described with reference to various embodiments, it is understood that the words, which have been used herein, are words of description and illustration, rather than words of limitation. Further, although the automated sunshade apparatus 100 has been described herein with reference to particular means, materials, and embodiments, the automated sunshade apparatus 100 is not intended to be limited to the particulars disclosed herein; rather, the automated sunshade apparatus 100 extends to all functionally equivalent structures, methods and uses, such as are within the scope of the appended claims. Those skilled in the art, having the benefit of the teachings of this specification, may effect numerous modifications thereto and changes may be made without departing from the scope and spirit of the automated sunshade apparatus 100 disclosed herein in their aspects

I claim:

1. An automated sunshade apparatus for protectively shading a roof of a vehicle comprising:
   one or more support members positioned at an end of the roof;
   a first elongate member rigidly attached to the one or more support members;
   two sets of flexible shades positioned above the first elongate member, each set of flexible shades fixedly attached to a plurality of rods operably connected to a linkage of a drive mechanism, wherein the linkage is pivotably attached to a central portion of the first elongate member, and wherein the linkage is configured to retractably extend the two sets of flexible shades outwardly in one of a clockwise direction and a counter clockwise direction over the roof of the vehicle; and a second elongate member positioned above and apart from the first elongate member, wherein the second elongate member is rigidly attached to the first elongate member for accommodating the two sets of flexible shades retracted therebetween.

2. The automated sunshade apparatus of claim 1, wherein the drive mechanism comprises
  one or more electric motors operably connected to the linkage of the drive mechanism;
  the linkage comprising:
    a driving rod comprising a first end and a second end, the driving rod operably coupled to the one or more electric motors at a first end of the driving rod for moving the driving rod in one of a forward direction and a reverse direction;
    a primary platelet comprising a first end and a second end, the primary platelet pivotably attached to the central portion of the first elongate member, wherein the first end of the primary platelet is operably coupled to the second end of the driving rod, and wherein a forward motion of the driving rod produces a rotary motion of the primary platelet;
    a driven rod comprising a first end and a second end, the driven rod operably coupled to the second end of the primary platelet, wherein the rotary motion of the primary platelet produces one of a forward motion and a backward motion in the driven rod; and
    a plurality of secondary platelets positioned on the driving rod and the driven rod, the secondary platelets spaced apart equally and pivotally attached to the first elongate member, each of the secondary platelets comprising a first end and a second end, wherein the first end of the each of the secondary platelets are attached to one of the driving rod and the driven rod and the second end of the each of the secondary platelets are operably coupled to the rods of one of the two sets of flexible shades, and wherein a rotary motion of the each of the secondary platelets retractably extend the two sets of flexible shades in one of a clockwise direction and a counter clockwise direction.

3. The automated sunshade apparatus of claim 1, wherein the drive mechanism comprises
  one or more electric motors operably connected to the linkage of the drive mechanism;
  the linkage comprising:
    horizontal racks operably engaged with a vertical pinion, the vertical pinion operably engaged to the one or more electric motors, wherein the horizontal racks engage with a top section and a bottom section of the vertical pinion for moving the horizontal racks in one of a forward direction and a reverse direction;
    driven gears operably engaged to the horizontal racks, wherein the horizontal racks move the driven gears in one of a clockwise direction and a counter clockwise direction; and
    the rods of the two sets of flexible shades operably engaged to the driven gears, wherein a rotary motion of the driven gears retractably extend the two sets of flexible shades in one of a clockwise direction and a counter clockwise direction.

4. The automated sunshade apparatus of claim 1, further comprising one or more auxiliary rods positioned vertically opposite the rods fixedly attached to the flexible shades, wherein each of the one or more auxiliary rods are fixedly attached to an auxiliary flexible shade, and wherein the one or more rods are configured to extend the auxiliary flexible shades beyond the end of the roof.

5. The automated sunshade apparatus of claim 1, wherein each of the two sets of the flexible shades are spaced apart in a louvered arrangement for allowing wind to pass between adjacent flexible shades.

6. The automated sunshade apparatus of claim 1, wherein each of the two sets of the flexible shades are of a single continuous material.

7. The automated sunshade apparatus of claim 1, wherein the dimensions of the two sets of the flexible shades, the first elongate member, and the second elongate member are varied based on a make and a type of the vehicle.

8. The automated sunshade apparatus of claim 1, wherein the two sets of the flexible shades are of one or more colors.

9. The automated sunshade apparatus of claim 1, wherein the automated sunshade apparatus is extendable and retractable to conform to different dimensions of the roof based on a make and a type of the vehicle.

10. An automated sunshade apparatus for protectively shading a roof of a vehicle comprising:
  one or more support members positioned at an end of the roof;
  a first elongate member rigidly attached to the one or more support members;
  two sets of flexible shades positioned above the first elongate member, each set of flexible shades fixedly attached to a plurality of rods operably connected to a linkage of a drive mechanism;
  the drive mechanism comprising:
    one or more electric motors operably connected to the linkage of the drive mechanism; and
    the linkage comprising:
      a driving rod comprising a first end and a second end, the driving rod operably coupled to the one or more electric motors at the first end of the driving rod for moving the driving rod in one of a forward direction and a reverse direction;
      a primary platelet comprising a first end and a second end, the primary platelet pivotably attached to the central portion of the first elongate member, wherein the first end of the primary platelet is operably coupled to the second end of the driving rod, and wherein a forward motion of the driving rod produces a rotary motion of the primary platelet;
      a driven rod comprising a first end and a second end, the driven rod operably coupled to the second end of the primary platelet, wherein the rotary motion of the primary platelet produces one of a forward motion and a backward motion in the driven rod; and
      a plurality of secondary platelets positioned on the driving rod and the driven rod, the secondary platelets spaced apart equally and pivotally attached to the first elongate member, each of the secondary platelets comprising a first end and a second end, wherein the first end of the each of the secondary platelets are attached to one of the driving rod and the driven rod and the second end of the each of the secondary platelets are operably coupled to one of the two sets of flexible shades, and wherein a rotary motion of the each of the secondary platelets retractably extend one of the two sets of flexible shades outwardly in one of a clockwise direction and a counter clockwise direction over the roof of the vehicle; and a second elongate member positioned above and apart from the first elongate member, wherein the second elongate member is rigidly attached to the first elongate member for accommodating the two sets of flexible shades retracted therebetween.

11. The automated sunshade apparatus of claim 10, further comprising one or more auxiliary rods positioned vertically opposite the rods fixedly attached to the flexible shades, wherein each of the one or more auxiliary rods are fixedly attached to an auxiliary flexible shade, and wherein the one or more rods are configured to extend the auxiliary flexible shades beyond the end of the roof.

12. The automated sunshade apparatus of claim 10, wherein each of the two sets of the flexible shades are spaced apart in a louvered arrangement for allowing wind to pass between adjacent flexible shades.

13. The automated sunshade apparatus of claim 10, wherein each of the two sets of the flexible shades are of a single continuous material.

14. The automated sunshade apparatus of claim 10, wherein the dimensions of the two sets of the flexible shades, the first elongate member, and the second elongate member are varied based on a make and a type of the vehicle.

15. The automated sunshade apparatus of claim 10, wherein the automated sunshade apparatus is extendable and retractable to conform to different dimensions of the roof based on a make and a type of the vehicle.

16. An automated sunshade apparatus for protectively shading a roof of a vehicle comprising:
one or more support members positioned at an end of the roof;
a first elongate member rigidly attached to the one or more support members;
two sets of flexible shades positioned above the first elongate member, each set of flexible shades fixedly attached to a plurality of rods operably connected to a linkage of a drive mechanism;
the drive mechanism comprising:
one or more electric motors operably connected to the linkage of the drive mechanism; and
the linkage comprising:
horizontal racks operably engaged with a vertical pinion, the vertical pinion operably engaged to the one or more electric motors, wherein the horizontal racks engage with a top section and a bottom section of the vertical pinion for moving the horizontal racks in one of a forward direction and a reverse direction;
driven gears operably engaged to the horizontal racks, wherein the horizontal racks move the driven gears in one of a clockwise direction and a counter clockwise direction;
the rods of the two sets of flexible shades operably engaged to the driven gears, wherein a rotary motion of the driven gears retractably extend the two sets of flexible shades in one of a clockwise direction and a counter clockwise direction; and
a second elongate member positioned above and apart from the first elongate member, wherein the second elongate member is rigidly attached to the first elongate member for accommodating the two sets of flexible shades retracted therebetween.

17. The automated sunshade apparatus of claim 16, further comprising one or more auxiliary rods positioned vertically opposite the rods fixedly attached to the flexible shades, wherein each of the one or more auxiliary rods are fixedly attached to an auxiliary flexible shade, and wherein the one or more rods are configured to extend the auxiliary flexible shades beyond the end of the roof.

18. The automated sunshade apparatus of claim 16, wherein each of the two sets of the flexible shades are spaced apart in a louvered arrangement for allowing wind to pass between adjacent flexible shades.

19. The automated sunshade apparatus of claim 16, wherein each of the two sets of the flexible shades are of a single continuous material.

20. The automated sunshade apparatus of claim 16, wherein the dimensions of the two sets of the flexible shades, the first elongate member, and the second elongate member are varied based on a make and a type of the vehicle.

* * * * *